United States Patent [19]

Von Voros

[11] 4,034,477
[45] July 12, 1977

[54] DIGITAL ELECTRO-OPTICAL MICROMETER AND GAGES

[75] Inventor: Geza Von Voros, Glen Rock, N.J.

[73] Assignee: Optograms, Inc., Oakland, N.J.

[21] Appl. No.: 675,689

[22] Filed: Apr. 9, 1976

Related U.S. Application Data

[60] Continuation-in-part of Ser. No. 496,325, Aug. 9, 1974, abandoned, which is a division of Ser. No. 229,944, Feb. 28, 1972, abandoned.

[51] Int. Cl.² .......................................... G01B 7/02
[52] U.S. Cl. ........................... 33/143 L; 33/125 C; 33/147 N; 33/DIG. 3
[58] Field of Search ......... 33/125 A, 125 C, 143 L, 33/143 M, 143 K, 147 N, 163, 166, 170, DIG. 3

[56] References Cited

U.S. PATENT DOCUMENTS

| | | | |
|---|---|---|---|
| 2,788,519 | 4/1957 | Caldwell | 33/125 C |
| 3,142,121 | 7/1964 | Stefanov | 33/143 L |
| 3,197,873 | 8/1965 | Aller | 33/143 L |
| 3,271,564 | 9/1966 | Rosenfeld et al. | 33/138 |
| 3,482,321 | 12/1969 | Inshaw | 33/166 |

FOREIGN PATENT DOCUMENTS 53,410  1/1934  Norway .................. 33/163

*Primary Examiner*—Richard E. Aegerter
*Assistant Examiner*—Richard R. Stearns
*Attorney, Agent, or Firm*—Ralph R. Roberts

[57] ABSTRACT

This invention pertains to an electro-optical digital precision micrometer in which a precision lead screw is carried by the frame in precision bearings mounted in supports in the frame and is carried by and in precise alignment with the movement of the movable anvil. A precision nut such as a ball nut is mounted on this precision screw and is carried by the movable anvil so that as it is moved the lead screw is caused to be rotated in response to the movement of the anvil. A rotatable interrupter disc is carried by and on the end of the lead screw and interrupts a light beam so that electrical pulse signals are fed to an encoder. In this embodiment the linear motion of the movable anvil or member is converted into electrical pulse signals in such a way that both the displacement and the direction of motion can be displayed. A dash pot system is provided in all systems so as to govern or regulate the speed of movement of the movable anvil and associated interrupter disc so that as the lines thereon cut or interrupt the beam of light each line interruption is positively detected by the associated photosensor.

2 Claims, 12 Drawing Figures

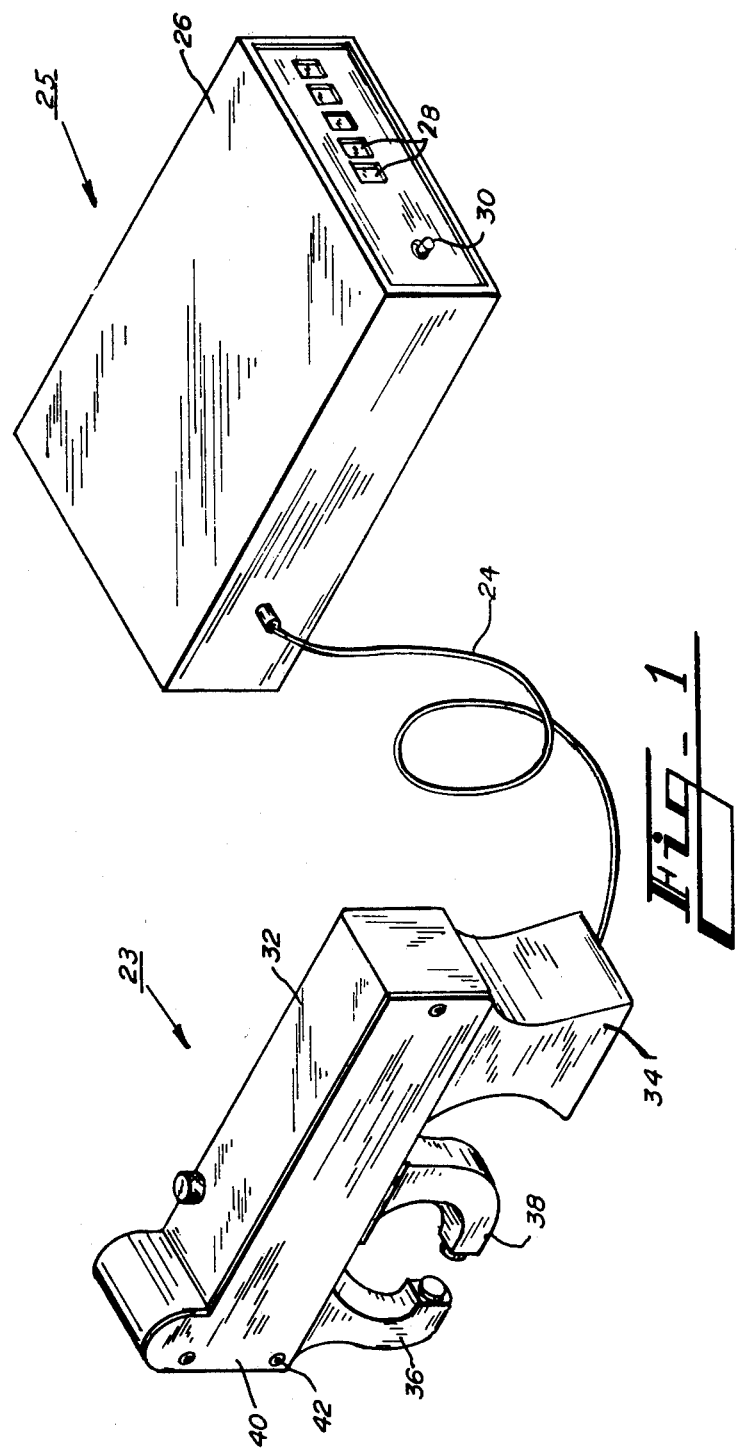

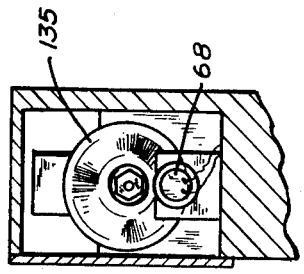
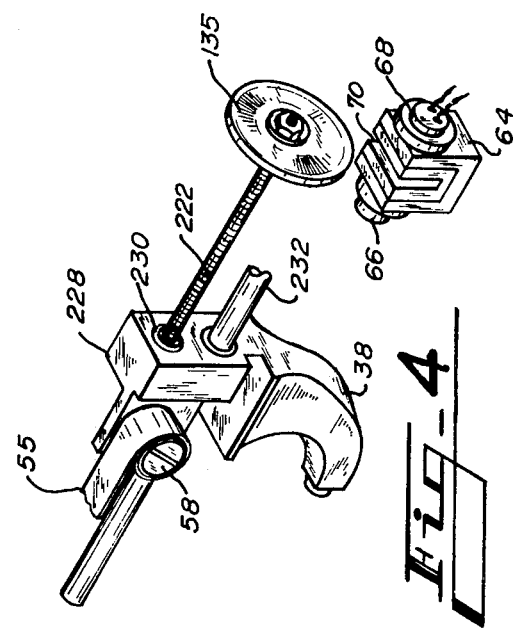
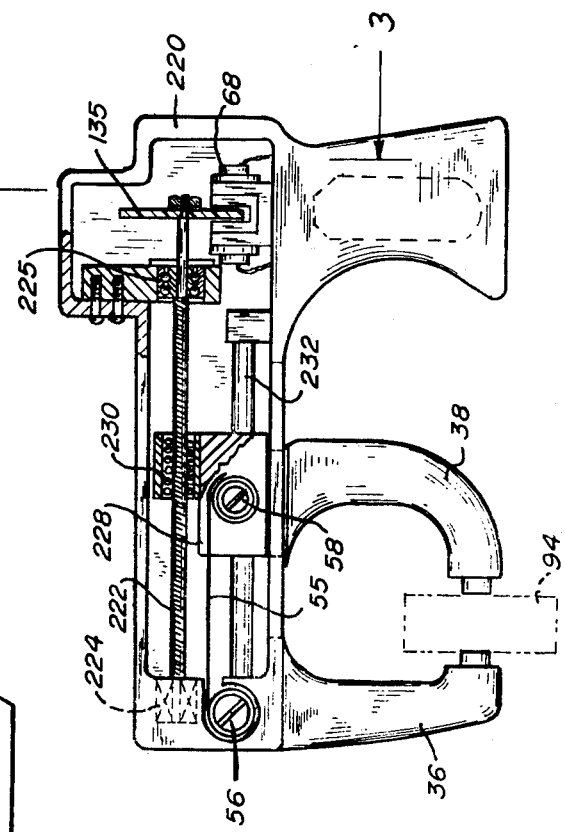

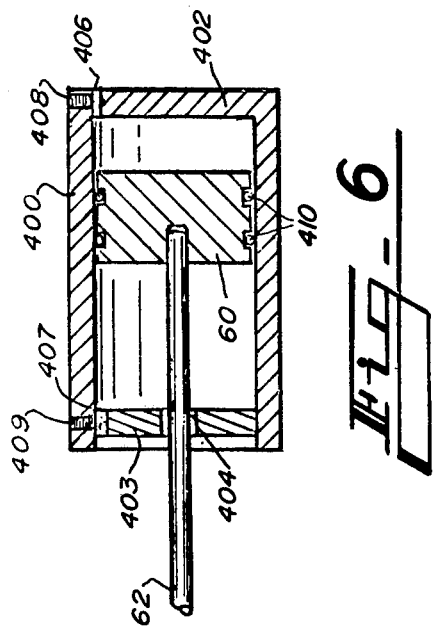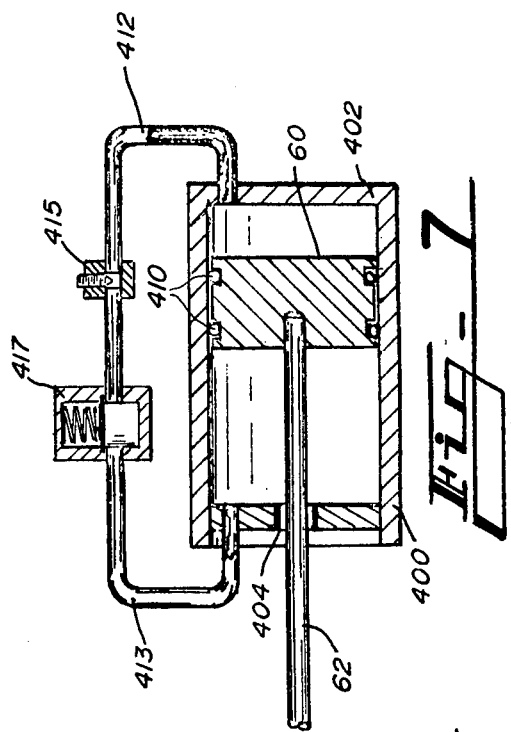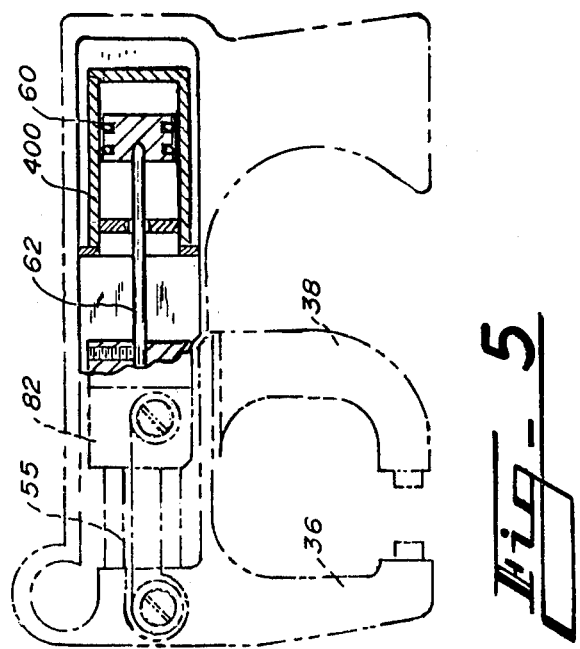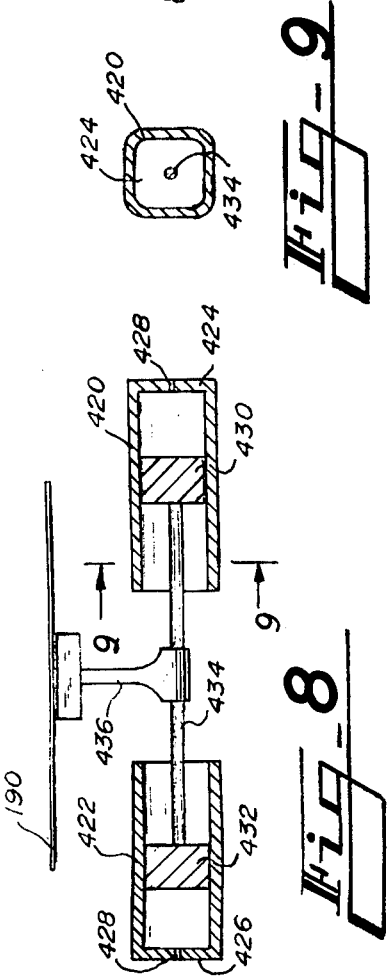

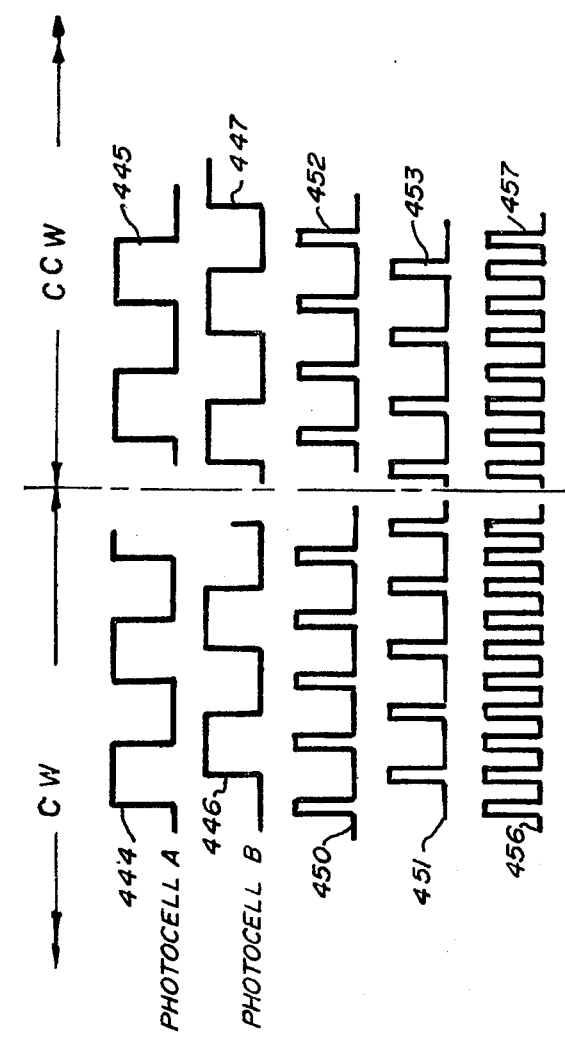
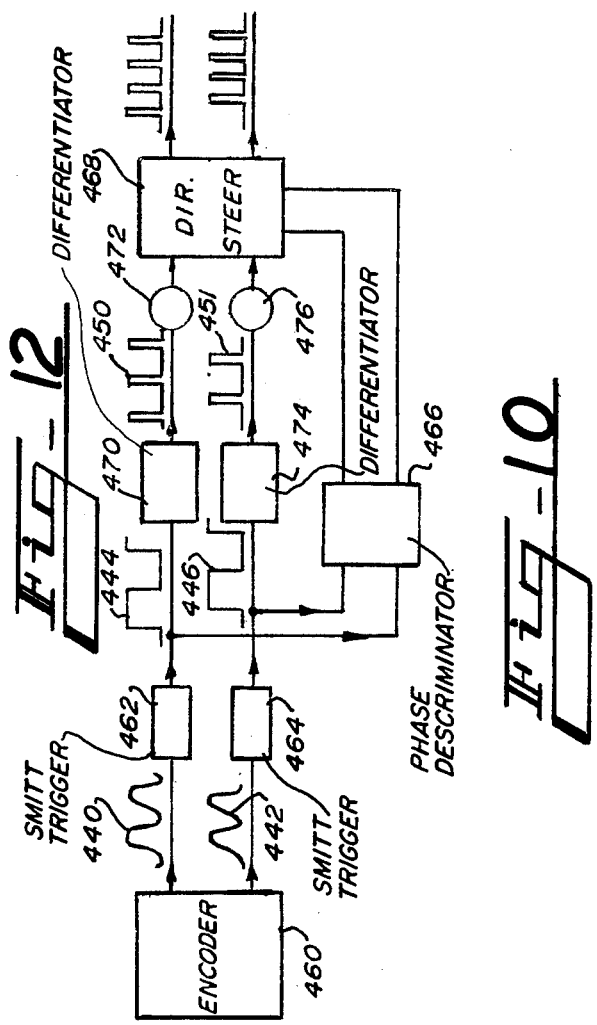
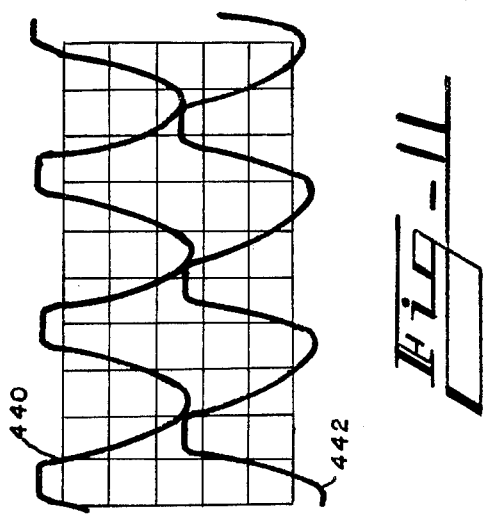

DIGITAL ELECTRO-OPTICAL MICROMETER AND GAGES

This is a Continuation-in-Part application deriving from my Continuation-in-Part to application Ser. No. 496,325 filed Aug. 9th, 1974, now abandoned. This Continuation-in-Part application Ser. No. 496,325 was a Divisional of my originally filed application Ser. No. 229,944, filed Feb. 28th, 1972, now abandoned.

BACKGROUND OF THE INVENTION

1. Field of the Invention

With reference to the classification of art as established in the United States Patent & Trademark Office the field of art to which this invention pertains is found in the general Class of "Geometrical Instruments (Class 33) and more particularly in the subclass of "distance measuring" (subclass 125 R). Also of note is the art in the further subclass of "opposed contacts" (subclass 143R).

2. Description of the Prior Art

Micrometers which utilize a precision ground lead screw running in a precision nut are well known. In these devices the rotary motion of the barrel is read upon a scale inscribed upon the rotary anvil or a shell carried thereby. These micrometers, of course, are well known and for many years have been a standard in machine shops for use in measuring workpieces. Micrometers, having heads with optical rotary encoders attached to the lead screw, and with displayed readout, have been brought to the market in the past few years. Vernier calipers and height gages using precision-engraved scales are also well known and are particularly useful in marking measurements of relatively long distances such as for measuring from zero to twelve inches or from zero to other units of a longer length. In the use of micrometers having a precision lead screw there have been many attempts and patents directed toward controlling the advancement of the lead screw to provide a determined amount of drive friction so that neither an excessive squeeze nor too light an engagement or grip on the object to be measured is provided in the use of the micrometer. It is well known, for example, that different inspectors well skilled in the use of a lead-screw type of micrometer and using the same micrometer under the same conditions may vary as much as two or three ten-thousandths of an inch in reading measurement for the same workpiece. This variation, of course, occurs because of the head manipulation provided by the inspector himself.

In the same manner the use of a vernier caliper and its precision scale depends upon the accuracy of the scale as well as the skill of the inspector in setting the jaws of the vernier caliper. In addition to the requirements of physical dexterity in using these two well known types of measuring instruments there is also the potential visual tricks played upon the inspector in reading the setting of the barrel or reading of the vernier scale wherein numbers are transposed. Sometimes it becomes a matter of aligning or reading the degree of coincidence of a pair of lines as to which line is the nearest to the precise reading of the scales. Precision end measuring rods, gage-blocks (also known as Jo-blocks) and like precision measuring members are, of course, well known. The difficulty in using such type of devices is the necessity of accumulating the precise desired quantity of these precision-made measuring members. Dial indicators as measuring tools are also well known; however, their accuracy is again subject to many problems of wear and the maintenance of the gears and movable rack as well as the reading of the dials and the initial setting of the indicator.

In the present invention it is contemplated that a micrometer having a fixed anvil carried by a frame will have a movable anvil which is moved to a closed condition by means of a constant force spring. The operator or user of the micrometer pulls or draws the movable anvil from the fixed anvil so that the piece to be measured is brought between the anvils, after which the movable anvil is released so that it is moved to and against the piece being measured under the influence of the predetermined constant force spring. After the movable anvil has been brought to rest against the workpiece to be measured, an electrical readout visually displays the precise measurement between the fixed anvil and the movable anvil. In gages such as height gages modifications of the frame are made and the same measuring means are provided.

It is, of course, well known to use glass or metal scales to measure the travel of the workstables of machine tools. These scales and other measuring systems are usually fixed in relation to a frame and the scale itself is directly read in relation to the position of the indicating device as it is moved along the bed or table of the machine or work member which is used to measure the amount of travel of the machine tool or workpiece. Such readings do not convert the travel into digital readouts except some of the latest electro-optical linear encoders.

Rack and pinion systems used for driving rotary encoders are known as well as tape systems using a tape drawn around a precision pulley. It is also known to utilize a rotary movement of a precise roller over the face of a machine tool workstable. However, insofar as is known, these systems tend to develop both random and accumulative errors arising from dirt, linear expansion or contraction because of changes in temperature or because of wear or slippage, causing these measuring systems to lose their precision even if the accuracy is initially provided.

In particular, as far as is known, there has been no tape system for a hand held micrometer vernier or height gage using a tape stored in a spring-loaded spool with the tape fed from the spool. Where the rotation of a precision roller is caused by said roller being driven by movement of the roller along the workpiece, this type of system in a micrometer or caliper would require that the workpiece being measured would be free of oil, dirt or a combination thereof. This, of course, cannot be guaranteed although essential in a very precision instrument.

In the present invention the electro-optical digital positioning micrometer, or linear digital gage utilizes a precision screw which is caused to be rotated and with it a radially arranged interrupter disc is rotated to cause electrical pulses to be generated and fed to a digital readout. Each micrometer indicator is disposed to read the linear travel of the movable anvil. The screw in its mounted condition within the frame is moved to the closed condition in a constant force spring and during measuring operations the movable anvil is urged to a close condition. This anvil is maintained by this force spring in a fixed relation to the fixed anvil as the movable anvil is moved to a measuring condition on the workpiece to be measured. The screw and the rest of the movable portions of the micrometers are maintained in a substantially sealed enclosure condition so that the accuracy initially built into the micrometer will be maintained throughout its use and operation.

SUMMARY OF THE INVENTION

This invention may be summarized at least in part with reference to its objects. It is an object of this invention to provide, and it does provide, an electro-optical digital precision micrometer within a frame in which a screw is mounted so as to be rotated with the travel of a movable anvil. The screw, as it is moved with and by the movable anvil, engages and rotates an interrupter disc member whose radially arranged lines interrupt a light beam to cause a photosensor to feed these interruptions as electrical pulses to a digitial readout.

It is a further object of this invention to provide, and it does provide, an electro-optical digital precision micrometer wherein a precision lead screw having a large lead or pitch is carried by a pair of fixed bearings mounted in the frame of the measuring unit and in which a ball nut is carried by a bracket fixed to the movable anvil or member. As the movable member is moved the ball nut engages the lead screw so as to cause the lead screws to rotate. A radially arranged interrupter disc or member carried by the rotating screw is adapted to interrupt or cut a light beam to cause a photosensor or multiple arrangement thereof to feed a resulting signal as electrical pulses to a digital counter or readout.

In this embodiment the frame of the micrometer carries a precision lead screw rotatably supported in bearings so that the screw is in fixed relation to the frame while being rotatable therein. A precision nut such as a ball nut is carried on this screw and is attached to a bracket upon which is mounted the movable anvil of the micrometer. As the movable anvil is moved along a guideway it causes the precision screw to be rotated. This screw carries an interrupter disc upon the end of the screw and as it is rotated lines on the disc are caused to pass in front of the photoelectric sensor system and cause the pulses to be fed to a digital readout.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the digital electro-optical micrometer and modifications thereof including a height gage as adopted for use with a digital counter and readout and showing a preferred means for constructing the micrometer with a fixed and movable anvil. This specific embodiment and alternate embodiments thereof have been chosen for the purposes of illustration and description as shown in the accompanying drawings wherein:

BRIEF DESCRIPTION OF THE DRAWINGS

FIG. 1 represents a generally schematic isometric view showing an electro-optical micrometer of this invention as it is connected to a digital readout wherein the measurement of the movable anvil from its displacement from a fixed facing anvil is displayed on an electrical readout;

FIG. 2 represents a partly diagrammatic side view of an embodiment of a micrometer in which a precision lead screw is carried in bearings mounted in the frame of the micrometer and in which is precision nut is carried by a frame carrying the movable anvil which as it is moved causes the precision screw to be rotated;

FIG. 3 represents a sectional view taken on the lines 3—3 of FIG. 2 and looking in the direction of the arrows;

FIG. 4 represents an isometric view showing partly fragmentarily the components which make up the movable anvil system and the nut by which it is rotates the precision lead screw;

FIG. 5 represents a side view partly diagrammatic of the micrometer and showing in particular a pneumatic dash pot mounted in the handle portion;

FIG. 6 represents a sectional side view in enlarged scale of the dash pot of FIG. 3;

FIG. 7 represents a sectional side view in the scale of FIG. 4 of a closed circuit fluid actuated dash pot providing an alternate means of motion speed control;

FIG. 8 represents a diagrammatic sectional view showing yet another pneumatic dash pot control which additionally provides a precision guide means for a movable bracket:

FIG. 9 represents a sectional view of a pneumatic dash pot portion, this view taken on the line 9—9 of FIG. 8 and looking in the direction of the arrows;

FIG. 10 represents a circuit diagram showing the actuation of the pulse generating means so that the digital readout positively adds or substracts in accordance with the movement of of the interrupter member by a pair of photo detectors;

FIG. 11 represents the simultaneous sinusoidal waves of the two photocells as a line is passed in front of them, and FIG. 12 represents the reading of the pulses formed into square waves and the reading of each raising and falling edge of the square wave.

In the following description and in the claims various details will be identified by specified names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respect without departure from the concept and principles of the invention.

DESCRIPTION OF THE PREFERRED EMBODIMENT

As seen in FIG. 1

Referring now in particular to the drawings there is depicted in FIG. 1 a precision electro-optical micrometer of this invention wherein the micrometer mechanical portion is generally identified as 23. This portion is connected by means of a cable 24 to a digital readout 25. The electrical and electronic components are enclosed in a housing 26 which may or may not have an electrical power source therein. In the digital readout, of course, the front end of the case or cover is provided with numerical displays 28 which preferably are light-emitting diodes (led's) upon which a reading of the micrometer movement is displayed. A reset button 30 is also shown and is contemplated as being used in a conventional manner to erase a reading and reset the display to zero in a generally conventional manner.

Referring now in particular to the micrometer housing and to the mechanism as carried therein, it is to be noted that the housing itself, identified as 32 is a U-shaped housing having a rear handle portion 34. As carried by the frame of this micrometer is forward anvil 36 is fixed to the frame and cooperates with a movable anvil 38 which is carried by the frame and is urged toward the fixed anvil by means of a constant force spring means carried with the housing 32. A side cover plate 40 is removably retained by screws 42 so that the internal portions of this micrometer may be adjusted and serviced. This general arrangement is maintained throughout the several embodiments to be hereinafter more fully described. The movable anvil 38, as it is moved, causes several mechanism to be actuated resulting in electrical pulses which are related precisely to the motion of anvil 38 and are fed to the digital readout 25 for converting the travel extent of the movable anvil 38 into a readout shown by and light-emitting diodes 28.

Micrometer of FIGS. 2, 3, and 4

Referring next to the electro-optical micrometer as shown in FIGS. 2, 3 and 4, it is to be noted that in a fixed frame 220 is rotatable retained a precision lead screw 222 carried in bearings 224 and 225 so that the screw is in fixed axial relationship to the frame 220 while being maintained in a freely rotatable condition. A fixed anvil 36 and a movable anvil 38 are disposed to engage workpiece 94. A spring means in combination with either bearing 224 or 225 is disposed to urge screw 222 rightwardly to eliminate any backlash in the screw mounting. A slide bracket 228 is carried upon the upper portion of the movable anvil 38. This bracket may be integral with the anvil or be removably attached. Fixedly carried in this bracket is a ball nut 230 which is mounted upon the screw 222 and causes the screw 222 to rotate as the movable anvil and ball nut 230 moves back and forth along the screw. A constant force spring 55 has its left end carried by fixed post 56 fastened to the frame 220. The right end of the spring is retained by a post 58 carried by the bracket 228 portion of the movable anvil 38. A guide rod 232 is fixedly retained in the frame 220 and as mounted is aligned with the screw 222 to provide a positive guide for the travel of the movable anvil 38. Carried on the right end of the screw 222 is an interrupter disc 135 which is disposed so that the radial lines thereon pass into cutout 70 is bracket 64 so as to interrupt the beam of light from source 66 as it received by the photosensors 68.

Use and Operation of the Micrometer of FIGS. 2, 3 and 4

In operation the movable anvil 38 of the micrometer of FIGS. 2–4, as it is drawn from the fixed anvil 36, carries the ball nut 230 which as it is moved engages the screw 222 and by the pitch of the thread causes the screw to rotate. As the screw is rotated the interrupter disc 235 is also rotated. The lines on the rotated interrupter disc cause the beam of light from source 66 to be cut and the receiving photosensors 68 convert these to electrical pulses. As the movable anvil is moved back and forth on rod 232 against the constant force of the spring 55 the precision screw 222 is rotated as well as the mounted interrupter disc 135. The resulting determined number of pulses is converted to signals displayed on the readout 24.

As reduced to practice, the precision threaded screw 222 has a fast thread portion. In this contect a fast thread is defined as a non-locking thread. The screw is of a diameter less than five-eighths of an inch and the pitch of the thread is fewer than eight per inch. A fast thread is defined as a thread formed on a rotatable member which is rotated by and with the movement of a non-rotating mating nut along this threaded member. A preferred size is about three-eighths inch in diameter and four threads per inch. Ball nuts and shaft threads providing ultra precision ground threads may be used. The threaded shaft is in precise alignment with the movement of the movable anvil.

Dash Pot System of FIGS. 5–7

Referring next to FIGS. 5, 6 and 7, there are depicted two dash pot systems one of which must be employed in the micrometer to insure that a screw such as 222 in the embodiment of FIG. 2 is moved only at a speed which is sufficiently slow to insure that each of the lines on an interrupter disc is detected by photosensors 68. As seen in FIG. 5, a pneumatic opn system has a plunger or piston 60 carried in a cylinder 400 which has a closed end 402. This end may be an integral part of the cylinder or, if desired, may be an inserted disc. The other end of the cylinder is closed by end disc 403 which carries rod 62. Seal 404 prevents or limits the flow of air along rod 62. Passageways 406 and 407 through ends 402 and 403 are selectively restricted as to the flow of air by means of adjusting screws 408 and 409. Seals 410 are conventionally carried by piston 60 to insure no unwanted leakage past the piston. The maximum rate of movement or speed of travel of the tape is adjusted to suit the ability of a pair of photosensors 68 to detect the cutting of the beam of light. The constant force spring 55 pulls the movable anvil 38 toward fixed anvil 36. Counterflow or outward movement of the movable anvil is achieved by the operator of the instrument by exerting a force against the constant force spring.

System of FIG. 7

In FIG. 7 is depicted a closed hydraulic system similar to that of FIG. 6 but employing a liquid rather than air. The outer cylinder 400, instead of the open passageways found in ends 402 and 403, has fluid-tight connections to conductors 412 and 413. An adjustable flow restrictor mens 415 is shown as placed in conductor 412. A pressure accumulator 417 may also be provided as a connected means for conductors 412 and 413.

In operation the movement of the movable anvil 38 causes a like movement of piston 60. The rate or speed of travel of the associated tape is adjusted by restricting the rate of fluid transfer from the front to the rear of the cylinder 400. Accumulator 417 insures a constant pressure in the system.

System of FIGS. 8 and 9

Referring next to FIGS. 8 and 9, there is figuratively shown in alternate dash port system in which air is used. In this system opposed open-ended dash pots are adapted to provide a guide path for the movable anvil. This arrangement may eliminate or reduce to a certain extent the dependence on precision guide means such as guide rods. Housings 420 and 422 are shown as substantially square or rectangular in cross-sectional configuration. The inner corners of these housings are rounded for manufacturing economics. The end closing portions 424 and 426 of these housings have small passageways 428 which are so sized as to restrict or limit the flow of air therethrough to a desired amount.

Pistons 430 and 432 are slidable in housing 420 and 422 and are fixed to a common rod 434. Fixed to the midportion of this rod 434 is a bracket 436 which carries the tape member. Bracket 436 is connected to and is positively moved with the corresponding movement of anvil 38. The dash pot arrangement, as shown in FIGS. 8 and 9, not only controls and limits the speed of travel of the movable anvil and associated tape but also provides the means for establishing the travel path of the tape movable anvil 38.

Operation of Dash Pot Systems

Although modern electronic sensors would premit the tape member to be moved at a rate of travel in excess of 100 inches per second, a rate of travel of 1 inch per second permits much smaller and less expensive light beam sensing components including the interrupter disc. The dash pot not only establishes this limit but also as in a shock absorber prevents or severely limits an unwanted bounce action of a released movable anvil as moved by the constant force spring.

Sensing the Direction of Motion as in FIGS. 10, 11 and 12

Referring next to FIGS. 10, 11 and 12, there is diagrammatically shown a preferred means for a positive sensing of the direction and of the counting the pulses achieved as the tape causes the interrupter disc to rotate. Two or more photocells are optically aligned to produce two ninety degree phase-shifted sinusoidal waves each time an engraved line is passed in way of a light beam. As seen in FIG. 11, the line 440 depicts the wave pattern as read by a photocell "A" as seen on an oscilloscope. The line 442 depicts the wave pattern as read by a photocell "B" of the same engraved lines as they are passed by a photocell. Each wave pattern read by photocell "A" is repeated by photocell "B" except that the waves depicted by line 440 are ninety degrees ahead or behind line 442. These two sine waves are next converted into square waves by a circuit known as Smitt Trigger (commercially available integrated circuit such as Texas Instrument's SN7413). The obtained ninety degree phase-shifted square waves are depicted as lins 444,447,445 and 447. If the interrupter disc is moving clockwise for instance, as in FIG. 2, the movable anvil is away from the fixed anvil the squared output of the photocell of line 444 is leading the squared output of the other photocell represented by line 446. If the disc is moving counterclockwise for instance, or as in FIG. 2, the movable anvil is toward the fixed anvil, the squared output of the photocell "A" is represented by line 466 is trailing the squared output of the second cell "B" depicted by line 447. A circuit known as "phase discriminator" senses which photocell output is the one which leads the other and actuates a steering circuit accordingly. The function of this circuit is described hereinafter in respect to the circuit of FIG. 10.

A circuit known as "one-shot multi-vibrator" is used to differentiate the two squared waves. This circuit is commercially available and such a unit as in integrated circuit is available from Texas Instrument's (SN74123). The result of the differentiation provides a separate pulse for each raising and falling edge of the two square waves. These pusles are represented as lines 450, 451, 452 and 453. These pulses are summed or added as indicated by lines 456 and 457.

The phase discriminator's message arrives at a direction steering circuit before the pulses do because of a delay circuit as shown in FIG. 10. By the circuit shown in FIG. 10, no pulses are missed and they do into the correct forward or reverse counting circuits.

Circuit of FIG. 10

An encoder 460 is used with each interrupter disc or overlapped pair of discs and contains the light sources and the optically aligned photocells. The waves 440 and 442 are fed to the Smitt triggers 462 and 464 where they are converted to square wave forms 444 and 446. The signal output of Smitt triggers 462 and 464 are also fed to a phase discriminator 466 and from this discriminator to a direction steering circuit 468. The square wave signal 444 is fed to a differentiator 470 which reads each raise and fall of a pulse and as pulse signal 450 sends it to a delay 472 thence to the direction steering circuit 468. The square signal 446 from Scmitt trigger 464 is fed to differentiator 474 which reads each raise and fall of a pulse and as signal 451 sends it to a delay 476 and thence to the direction steering circuit 468.

The principles shown in the block diagram of FIG. 10 are those used in pulse reading and counting systems where forward and reverse are detected and strictly accounted.

In the above shown and described embodiments, particularly those showing the hand-held micrometers, the anvils are depicted as disposed to accomplish and accommodate outside measurements of workpieces. As inside measurements are as in important as outside measurements, anvils having ball contacts facing outwardly may conventionally be provided to engage inside diameters and other inside measurements to provide precise "inside" measurements of one-quarter inch, 10 threads per inch has been used for the micrometer of FIG. 2. These screws and their bearing retaining means may use a constant load spring to urge the screw to and against a bearing stop if such is deemed necessary. In any circumstance, end play in the screw and/or the nut must be as near zero as is possible and practical.

The electro-optical interrupter systems of this invention as applied to precision measuring requirements provides means for making a precision stop or control mechanism as built-in control or controls for motions, positioning and other operations of certain manufacturing equipment. The pulses generated may be used with electronic controls to provide ultra precision control of modern manufacturing equipment.

Terms such as "left", "right", "up", "down", "bottom", "top", "front", "back", "in", "out", "clockwise", "counterclockwise" and the like are applicable to the embodiments shown and described in conjunction with the drawings. These terms are merely for the purposes of description and to not necessarily apply to the position in which the several micrometer embodiments and height and linear gages may be constructed or used.

While particular embodiment and alternate embodiments have been shown and described it is to be understood the invention is not limited thereto since modifications such as the above suggested may be made within the scope of the accompanying claims and protection is sought to the broadest extent the prior art allows.

What is claimed is:

1. A digital electro-optical measuring micrometer, in which the measurement is precisely determined and initiates electrical pulses fed to a digital readout, said micrometer including: (a) a U-shaped housing transportable to a point of measurement and carrying all mechanically movable elements used to derive the precise measurement, said housing further including a fixedly supported anvil; (b) a movable anvil including a movable bracket slidably carried by and on a precision guide means supported by the housing and providing for movement toward and away from the fixedly supported anvil, said guide means disposed within the housing so that the movable anvil is precisely movable along a prescribed path and distance which is at least as great as a standard unit of measurement; (c) a constant force spring attached at one end to the housing and at the other end to the movable bracket so as to urge the movable anvil from the maximum open condition and toward the fixedly supported anvil and with said constant force applied at all intermediate positions therealong; (d) a precision theaded shaft in alignment with the precision guide means for the anvil having a fast thread formed on a portion thereof, this shaft rotatably and precisely positioned in the housing while fixed axially therein to prevent any longitudinal movement thereof while rotating; (e) a precision nut having a precision thread engaging means which is a precise mate to the fast thread on the precision shaft, said nut carried on and in immediate and positive driving engagement with the threaded portion of the precision threaded shaft, said nut carried by the movable bracket so that as the movable anvil is moved the shaft is rotated by the movement of the nut therealong; (f) a rotary disc-like interrupter member carried by and on the precision threaded shaft, said interrupter member precisely rotated with the rotational movement of the threaded shaft in response to the movement of the movable anvil against and with the bias of the constant force spring, said interrupter member having a sequence of equally spaced radially disposed lines thereon; (g) an encoder including a directed light source and at least a pair of photosensors carried by and as a part of said encoder, each photosensor adapted to receive a narrow beam of light from said source with said beam and photosensors arranged so that the line of the radial interrupter member interrupts the beam of light as the interrupter member is moved, said interruptions as read by the photosensor being converted to electrical pulse signal; (h) a dash pot having a piston connected to the movable anvil and movable in said dash pot, said piston movable by and with the movement of the movable anvil and having throttling means for establishing the maximum rotational speed of the interrupter member and the associated movable anvil in either of the two directions of movement to prevent bounce and to establish a sufficiently slow rate of the movement of the anvil whereat and whereby each every interruption of the beam of light is distinctly read by the photosensors to insure that each and every line on the rotating interrupter member as it interrupts the beam of light converts said interruptions to an electrical pulse signal, said pair of photosensors being optically aligned so as to produce substantially simultaneously phase-shifted waves and pulses each time a line interruption occurs and to feed this information to a discriminator circuit which ascertains from this information the direction of travel at that instant of time, and (i) a digital counter and read-out adapted to receive said electrical signals and convert said pulse signals to information which is fed to converting apparatus, said information corresponding to the precise linear position of the movable member.

2. A digital electro-optical measuring apparatus as in claim 1 in which the disc is sufficiently transparent so that the light beam from said light source may pass through a portion of said disc and the radial lines inscribed thereon are opaque so as to interrupt the beam of light when said lines are passed.

* * * * *